United States Patent
Alexander (10) Patent No.: US 9,434,307 B2
(45) Date of Patent: Sep. 6, 2016

(54) DYNAMIC ROLLOVER METER

(71) Applicant: Thomas Richard Alexander, Tenn Ridge, TN (US)

(72) Inventor: Thomas Richard Alexander, Tenn Ridge, TN (US)

(*) Notice: Subject to any disclaimer, the term of this patent is extended or adjusted under 35 U.S.C. 154(b) by 61 days.

(21) Appl. No.: 14/746,156

(22) Filed: Jun. 22, 2015

(65) Prior Publication Data
US 2015/0283944 A1  Oct. 8, 2015

Related U.S. Application Data

(63) Continuation-in-part of application No. 14/195,084, filed on Mar. 3, 2014.

(60) Provisional application No. 61/772,759, filed on Mar. 5, 2013.

(51) Int. Cl.
| | | |
|---|---|---|
| *B60Q 9/00* | (2006.01) | |
| *B60K 35/00* | (2006.01) | |
| *B60Q 1/00* | (2006.01) | |
| *G08B 5/36* | (2006.01) | |
| *G01P 1/08* | (2006.01) | |
| *B60R 16/023* | (2006.01) | |

(52) U.S. Cl.
CPC ............... *B60Q 9/00* (2013.01); *B60K 35/00* (2013.01); *B60Q 1/00* (2013.01); *G01P 1/08* (2013.01); *G08B 5/36* (2013.01); *B60K 2350/1056* (2013.01); *B60R 16/0233* (2013.01)

(58) Field of Classification Search
CPC ...... B60R 16/0233; G01C 1/00; B60Q 9/00; B60Q 1/00; B60K 35/00; B60K 2350/1056; G07C 5/00; G08B 5/36; G01P 1/08
See application file for complete search history.

(56) References Cited

U.S. PATENT DOCUMENTS

| | | | |
|---|---|---|---|
| 5,032,821 A * | 7/1991 | Domanico et al. ............ | 340/440 |
| 6,185,489 B1 * | 2/2001 | Strickler ...................... | 701/31.9 |
| 2008/0147280 A1* | 6/2008 | Breed ....................... | B60J 10/00 701/46 |
| 2010/0045360 A1* | 2/2010 | Howard et al. ............... | 327/365 |

OTHER PUBLICATIONS

"Automotive Rollover Detection and Early Warning Device;" Worcester Polytechnic Institute; Worcester, MA.

* cited by examiner

*Primary Examiner* — Yuen Wong
(74) *Attorney, Agent, or Firm* — Buckingham, Doolittle & Burroughs, LLC (57) ABSTRACT

A rollover meter device is disclosed that prevents vehicle rollover and minimizes the harm and damage caused if a rollover occurs. The rollover meter device comprises a meter housing component and a digital display component that displays the current angle of the vehicle. The meter housing component comprises microelectromechanical sensors (MEMS), such as a gyro component and two tri-axial accelerometer components which are mounted on a printed circuit board (PCB), along with LED warning lights, which is then secured behind the digital display inside the meter housing component. Furthermore, the meter housing component can be in electrical communication with a vehicle's gas supply, ignition, blade rotation, Power Take Off (PTO), and/or wireless device.

12 Claims, 5 Drawing Sheets

DYNAMIC ROLLOVER METER

CROSS-REFERENCE

This application is a continuation-in-part of Utility patent application Ser. No. 14/195,084 filed Mar. 3, 2014, which claims priority from Provisional Patent Application Ser. No. 61/772,759 filed Mar. 5, 2013.

BACKGROUND

Vehicle rollovers are a common cause of accidents, especially in the world of agriculture. Rollovers can cause severe vehicular damage, bodily harm and other problems, and a person may have to spend a lot of time and money on hospital bills and repairs. An effective solution is necessary.

The present invention warns a vehicle operator of an impending rollover, and changes to suit various conditions without being reprogrammed. The rollover meter device also operates in even the harshest conditions, and offers both audible and visible warnings of rollover conditions. The rollover meter device can shut off the engine and gas in the event of a rollover.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a rollover meter device that prevents vehicle rollover and minimizes the harm and damage caused if a rollover occurs. The rollover meter device comprises a meter housing component that can be in electrical communication with a vehicle, and the meter housing component comprises at least one microelectromechanical sensors (MEMS). The meter rollover device can be utilized with almost any standard vehicle. Typically, the meter housing component is rigidly attached behind the steering wheel, dashboard, or on the steering column of any vehicle. Furthermore, the meter housing component comprises a digital display component that displays the current angle of the vehicle and warns of critical tilt angles. Furthermore, the meter housing component can be in electrical communication with an external monitoring device, a vehicle's gas supply, ignition, blade rotation, and/or Power Take Off (PTO), such that if a critical angle is exceeded and rollover occurs, the rollover meter system automatically shuts off the vehicle's gas supply, ignition, blade rotation, and/or PTO, and an alarm sounds.

In a preferred embodiment, the microelectromechanical sensors (MEMS) comprise a gyro component and two accelerometer components which are mounted on a printed circuit board (PCB), along with LED warning lights, which is then secured behind the digital display inside the meter housing component. The digital display further comprises an LCD screen and push buttons for monitoring current angle and critical angle of the vehicle and control corrections required for safe operations, as well as data entry. Specifically, the push buttons allow a user to adjust warnings for a critical angle of a specific vehicle. Further, the digital display comprises green, red, and yellow flashing lights, wherein the yellow light flashes when there is danger of or possibility of a lateral rollover, and the red light flashes when a lateral rollover is expected rather than possible.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DESCRIPTION OF PREFERRED EMBODIMENTS

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention warns a vehicle operator or observer via wireless communications of an impending rollover, and changes to suit various conditions without being reprogrammed. The rollover meter device also operates in even the harshest conditions, and offers both audible and visible warnings of rollover conditions. The rollover meter device can shut off the engine and gas in the event of a rollover.

The rollover meter device comprises a meter housing component and a digital display component that displays the current angle of the vehicle. The meter housing component comprises microelectromechanical sensors (MEMS), such as a gyro component and two tri-axial accelerometer components which are mounted on a printed circuit board (PCB), along with LED warning lights, which is then secured behind the digital display inside the meter housing component. Furthermore, the meter housing component is in electrical communication with a vehicle's gas supply, ignition, blade rotation, and/or Power Take Off (PTO), or external monitoring device.

Figure 1:
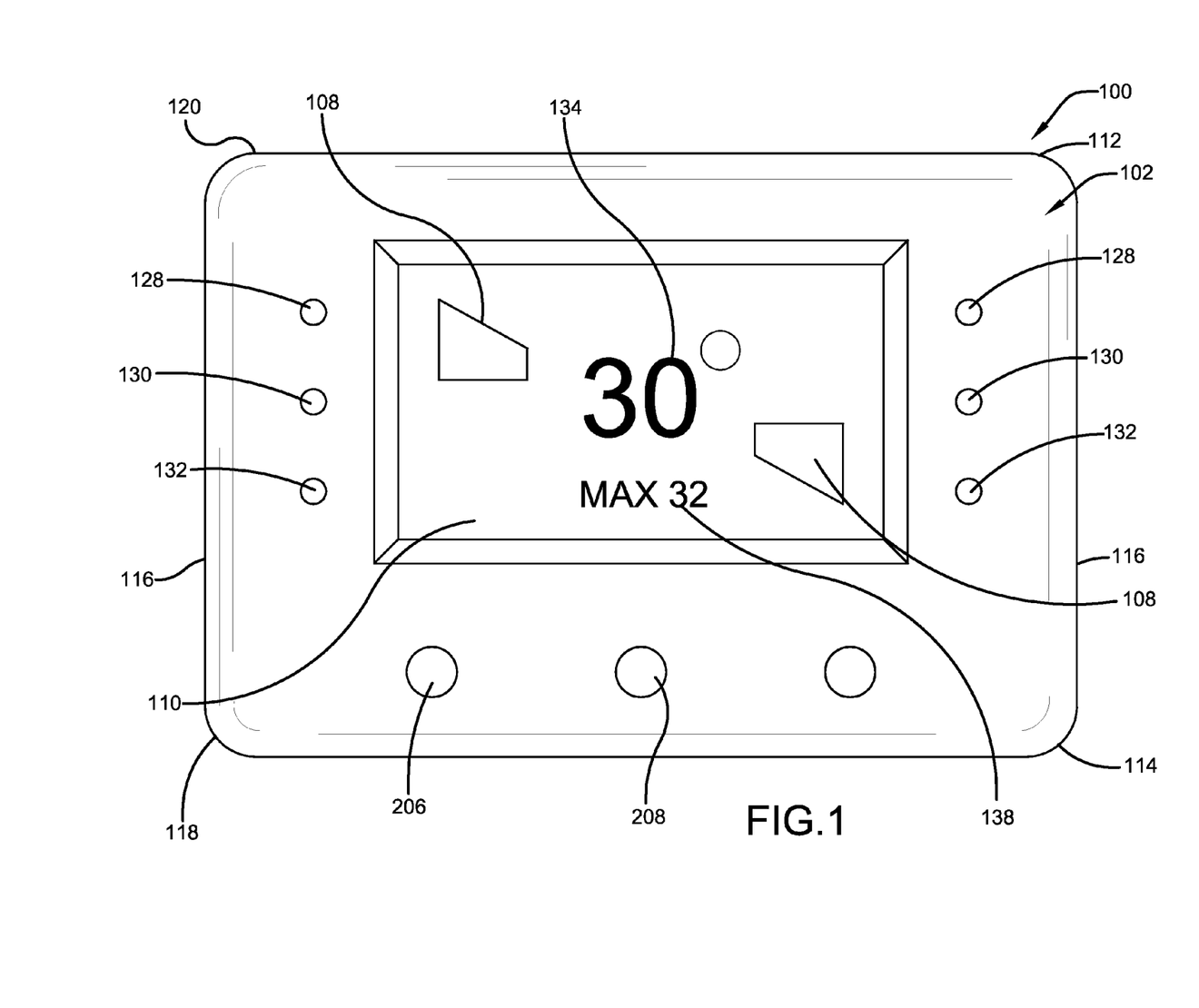
FIG. 1 illustrates a perspective view of the meter housing of the rollover meter device in accordance with the disclosed architecture.
Figures 2A, 2B, 2D:
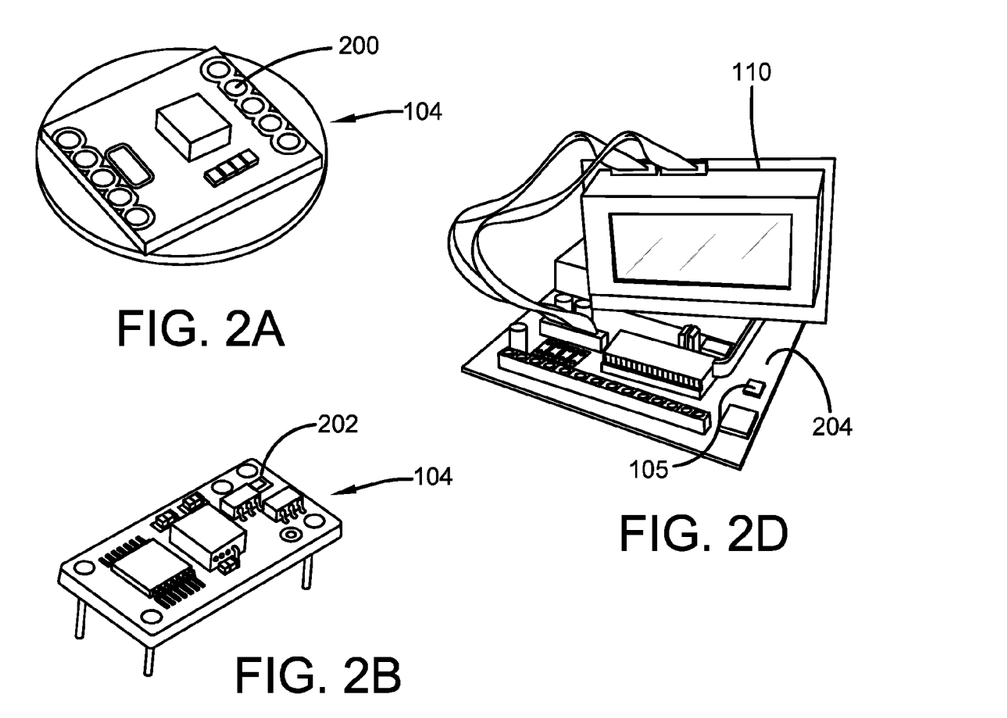
FIGS. 2A-2D illustrate a perspective view of the interior of the rollover meter device in accordance with the disclosed architecture.
Figure 2C:
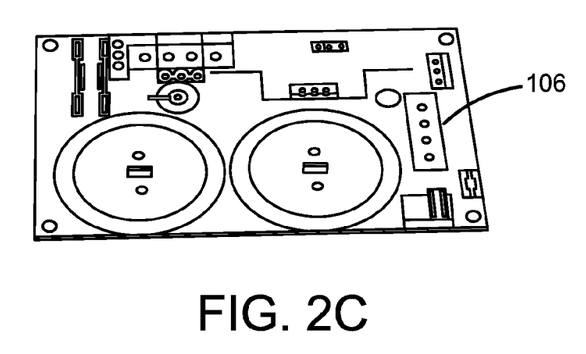

Referring initially to the drawings, FIGS. 1, 2A-2D, and 3 illustrate the rollover meter device 100 that prevents vehicle rollover and minimizes the harm and damage caused if a rollover occurs. The rollover meter device 100 comprises a meter housing component 102 that is in electrical communication with a vehicle, and the meter housing component 102 comprises microelectromechanical sensors (MEMS) 104 which are mounted on a printed circuit board (PCB) 106, along with LED warning lights 108 and a digital display 110 that captures and holds the greatest angle reached until rest of the vehicle (as shown in FIG. 1).

The meter rollover device can be utilized with almost any standard vehicle, such as a tractor, an ATV, a golf cart, a lawnmower, a car, a truck, etc. The meter housing component 102 comprises a top end 112, a bottom end 114, opposing sides 116, a front surface 118, and a back surface 120. Typically, the meter housing component 102 can be any suitable shape as is known in the art without affecting the overall concept of the invention, such as a rectangular prism, a cylinder, etc. The meter housing component 102 is a durable composite designed meter casing, and would generally be constructed of metal or homogeneous plastics, such as polyvinyl chloride (PVC), acrylonitrile butadiene styrene (ABS), polycarbonate (PC), composite polymers, etc., though any other suitable material may be used to manufacture the meter housing component 102 as is known in the art without affecting the overall concept of the invention.

The meter housing component 102 can also comprise a variety of colors and designs to suit user and manufacturing preference. While the shape and size of the meter housing component 102 may vary greatly depending on the wants and needs of a user, the meter housing component 102 is approximately between 0 and 3 inches in height as measured from a top end 112 to a bottom end 114, and approximately between 0 and 4 inches wide as measured from opposing sides 116, and approximately between 0 and 2 inches thick as measured from a front surface 118 to a back surface 120. Typically, the meter housing component 102 is made up of an injection molded case with a neoprene gasket, but could also be made of any other suitable material as is known in the art.

Figure 3:
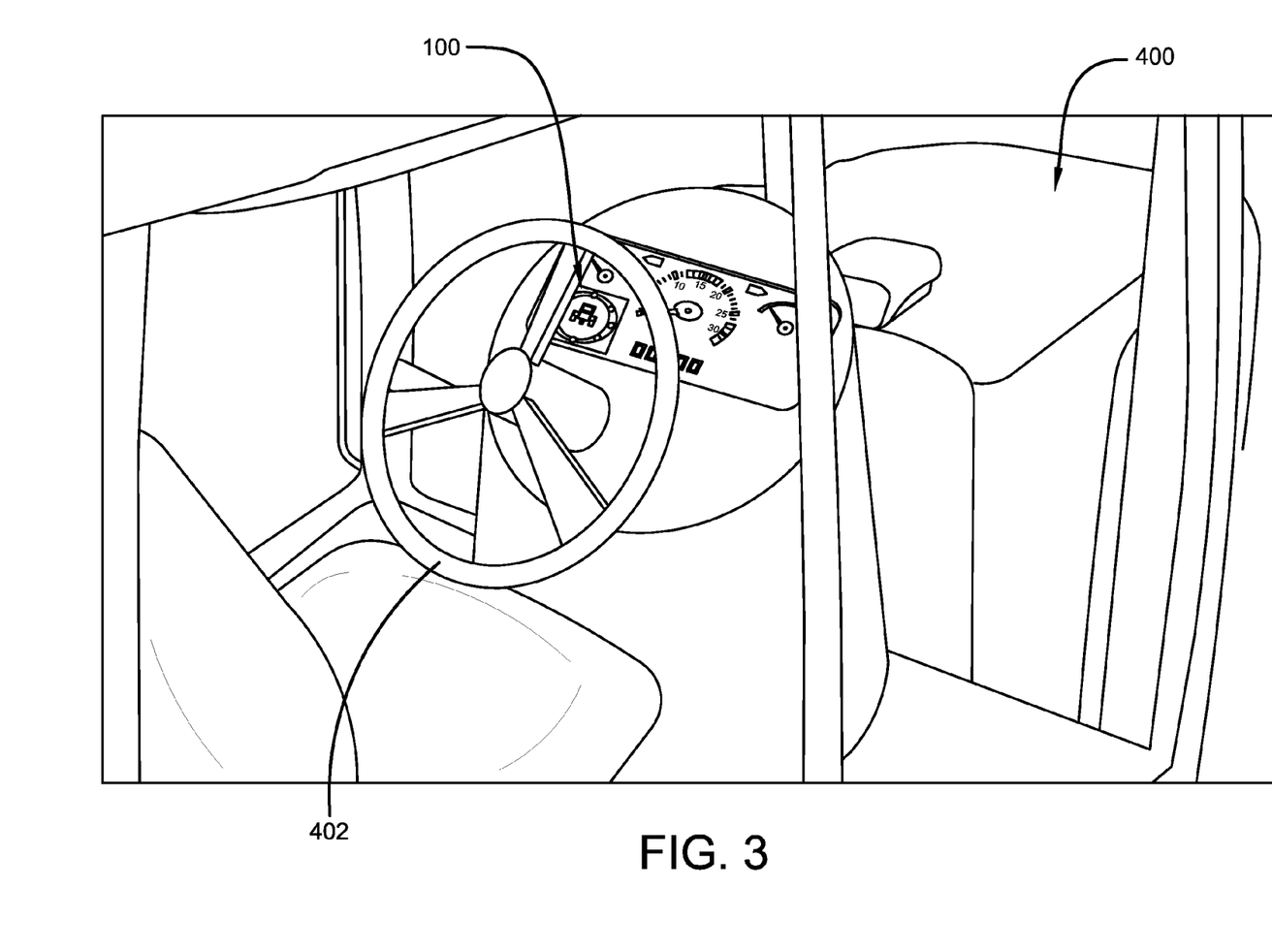
FIG. 3 illustrates a perspective view of the rollover meter device affixed behind a steering wheel of a vehicle in accordance with the disclosed architecture.

Typically, the meter housing component 102 is releasably attached behind the steering wheel 402, on the steering column or dashboard of any vehicle 400 (as shown in FIG. 3), and can also be moved to different vehicles or equipment and reprogrammed as needed. The meter housing component 102 can also comprise various mounting devices to attach the housing component 102 to different vehicles, such as a swivel magnetic mounting base to mount it to anything metal, a swivel suction cup base to mount it to glass, and C-clamps to bolt it down if required, so the device 100 can be easily moved from vehicle to vehicle. Further, the meter housing component 102 can be secured to any suitable position in the vehicle as is known in the art, as long as the meter housing component 102 can function to determine the critical angle of the vehicle. The meter housing component 102 can be pre-installed in the vehicle or can be an aftermarket addition to any vehicle. The meter device 100 is typically powered by a 12 Volt DC plug-in type external power source receptacle or with a rechargeable 3 Volt DC battery (2300 milliamp hours), so that the device 100 can be powered by the vehicle or powered by the battery as desired. The rechargeable battery would be charged via a charging port (not shown) on the device which is typically a USB port capable of charging the device as well as a communication interface. Further, the rollover meter device 100 is programmed to automatically shut off (power down) if no motion is detected within 15 minutes.

Furthermore, as shown in FIGS. 2A-2D, the meter housing component 102 comprises a MEMS sensor that measures orientation with 10 bit accuracy or 0.2 degrees resolution to tilt measurement. Specifically, the MEMS sensor 104 comprises a gyro 200 and two accelerometers 202. The gyro 200 detects movement on all axis to determine attitude change and the accelerometers 202 measure gravitational pull to determine the angle with respect to the Earth. Typically, the accelerometers 202 are tri-axial Thus, by sensing the amount of acceleration, users can analyze how the device is moving versus the position of the gyro axis to calculate an accurate rate of change or angular motion. The sensors (i.e., gyro 200 and accelerometers 202) will then relay information to a microprocessor 204 that is programmed to interpolate the received signals and display the signals as graphics for visual reference on an digital display 110 (i.e., liquid crystal display (LCD) screen).

Specifically, the microprocessor 204 takes the analog signals generated by the gyro 200 and the accelerometers 202 and displays the signals to the user as usable data in a graphical format and digital text readout via the microprocessor's programmable firmware. The graphics will include visual tilt indication and also a text indication. The microprocessor's firmware will also be programmed to compare current real time tilt indications to the set alarm values and be used to cause the warning LED's to turn on and off and flash. The microprocessor 204 will also cause the sonic horn to have a wavering or steady tone based on the warning level reached. The LCD (digital display 110) comprises a microprocessor 204 built into it. The microprocessor 204 and the LCD screen 110 are both mounted on a 4.25"×2.5" (or 4" square PCB, or any other suitable sized PCB that will fit the housing) printed circuit board (PCB) 106 and may be called the controller.

Additional components can be linked to the microprocessor 204 which will display the data on a 3"×2" LCD graphic screen 110. For example, the components can include, but are not limited to, four IC chips, one EPROM, six resistors, 11 LED lights, a digital readout screen (i.e., LCD graphic screen), two tri-axial accelerometers, one gyro, four presets for the critical angles, two relay contacts, and a blue tooth synced chip 105. The PCB 106 is powered by 3 Volt rechargeable batteries and/or an external power source. Additional programming can be needed for certain functions that have the capability of offering multiple settings.

The meter device 100 is programmed or calibrated for each vehicle initially based on track width (i.e., how far tires are apart measured from side to side) and center of gravity, using the following equation: $90°-(\tan^{-1}(CG/Track/2))$. The critical angles are then calculated via the microprocessor to establish the safe, caution, and danger ranges. The meter device 100 also allows a user to customize the warning and/or alarm angles.

The meter device 100 allows a user to customize the warning or alarm angles. The front of the meter will contain push buttons 206 that would interface with the microprocessor to set the tilt angle limits. This would be done similar to setting alarm clocks. One button would be used to rotate through the settings and then up and down buttons would be used to change values. There would also be a reset button 208 to clear held maximum tilt values. The reset could also be done by pressing two buttons at the same time without adding a third button. By pressing and releasing the reset button 208 on the front of the meter 100, the last highest angle reached can be reset.

The microprocessor 204 will be programmed to calculate critical angles for the user and establish the alarm points by entering the desired vehicles center of gravity and track width. The user can also manually set their own desired alarm points. The user will also have the option to save up to four vehicle settings to move the meter from vehicle to vehicle as desired without re-entering any data. The user would enter the measured center of gravity (CG) and track width for the vehicle, or the desired angles. The device 100 could also calculate the center of gravity and track width for the vehicle by entering the vehicle's VIN (vehicle identification number) into the device and downloading information from the Internet. The device can be connected to the Internet via a USB cable connected to the device's charging port. Thus, the charging port would be capable of charging the device, as well as a communication interface for online Internet downloads. Once the VIN is entered, the rollover meter device 100 can download the exact track width and CG for the vehicle, as long as the vehicle has had no modifications made to it. If no Internet connection is available, the user can still manually enter track width and CG for the vehicle, instead of the VIN number, and the rollover meter device 100 will calculate the critical angle from these measurements as well, without needing an Internet connection.

For manual setting, a user would press and hold the reset button 208 till it goes into the calibrating function screen. From this display, the adjust button is pushed and released in each area to the desired number of degrees. Next, the reset button 208 is pushed and released to hold the indicated value and proceed to the next angle. To exit the screen, a user would press and hold the reset button 208 or it will default to the main screen after a few seconds. The areas where the angles can be set include: LGLO=left green low setting in degrees)(0-90°; LGHI=left green high setting in degrees)(0-90°; LYLO=left yellow low setting in degrees)(0-90°; LYHI=left yellow high setting in degrees)(0-90°; LR=left red setting in degrees)(0-90°; RGLO=right green low setting in degrees)(0-90°; RGHI=right green high setting in degrees) (0-90°; RYLO=right yellow low setting in degrees) (0-90°; RYHI=right yellow high setting in degrees)(0-90°; and RR=right red setting in degrees)(0-90°. Further, there would be an additional four presets.

Furthermore, the meter housing component 102 is in electrical communication with a vehicle's gas supply, ignition, blade rotation, and/or Power Take Off (PTO), such that if a critical angle is exceeded and rollover occurs, the rollover meter system 100 automatically shuts off the vehicle's gas supply, ignition, blade rotation, and/or PTO, and an alarm sounds. Specifically, there are two 12 Volt DC output terminals, one off the yellow range of LED lights 130 and one off the red range of LED lights 132 on the digital display component 110, to operate external functions as desired. The meter housing component 102 can also comprise a universal Bluetooth wireless device (or synced chip) 105. This wireless device allows a user to communicate with the rollover meter device 100 remotely via a smart phone or headset/headphones. The wireless device could also be in communication with the vehicle's warning devices and could activate such devices when a critical angle is reached, such as sounding a horn or flashing a beacon, or even call 911.

The meter housing component 102 further comprises a digital display component 110 that displays a plurality of control components for monitoring current angle and critical angle of the vehicle and control corrections required for safe operations (as shown in FIG. 1). Specifically, the digital display component 110 can comprise a LCD display that displays graphics for visual reference for a user.

The digital display component 110 captures and holds the greatest angle reached until the vehicle is at rest. The digital display component 110 also serves as the function adjustment and calibrating screen during programming and setup. Further, the digital display component 110 can also comprise green 128, yellow 130, and red 132 flashing lights. These lights are progressive LED lights on the outside left and right edges that progress green to yellow to red in unison with the LED graphics. The last yellow and red light on either side are both programmed to flash when its defined angle is reached. Specifically, the yellow light 130 flashes when there is danger of or possibility of a lateral rollover. The red light 132 flashes when a lateral rollover is expected rather than possible. Any other suitable flashing lights displaying the angles can be used with the digital display component 110 as is known in the art to display any number of things without affecting the overall concept of the invention. Further, the meter device 100 comprises a built-in siren (or sonic horn) that has a wavering tone when the yellow caution range is reached and a steady tone when the red range is reached. Additionally, a large, red LED in the center (not shown) flashes when the red range is reached as a secondary warning signal. The displayed angle 134 shown on the screen also flashes when a yellow or red angle is reached or one of the pre-set angles. The screen also displays and holds the max angle 138 which is the maximum angle reached before the critical angle is reached.

Specifically, the digital display component 110 will be made up of two injection molded housing halves, a neoprene gasket, a clear lens, the LCD screen, and a printed circuit board. The printed circuit board is made up of a (1) EPROM, (2) accelerometers, (1) gyro, (4) IC chips, (6) resistors, (7) LED lights, a battery level indicator, a blue tooth synced chip, a microprocessor and a power source (i.e., a lithium battery). The lights will come on in series until the maximum critical angle is reached. Further, the LCD screen has a built in back light that illuminates automatically in low light areas. The display component 110 can also have a battery charge indication component, or a test function for checking the siren, graphics and lights of the LCD screen.

Figure 4:
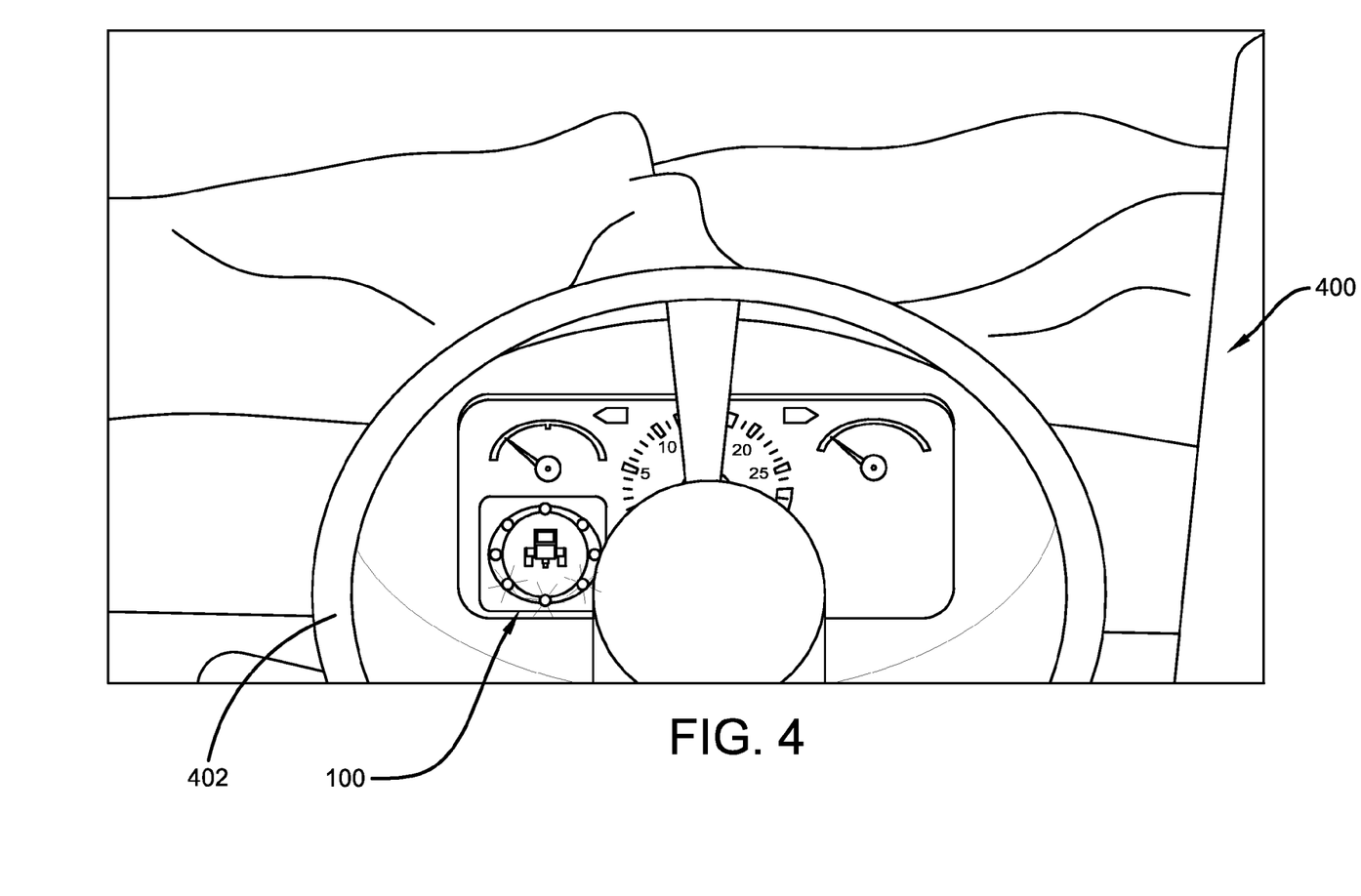
FIG. 4 illustrates a perspective view of the rollover meter device in use in accordance with the disclosed architecture.
Figure 5:
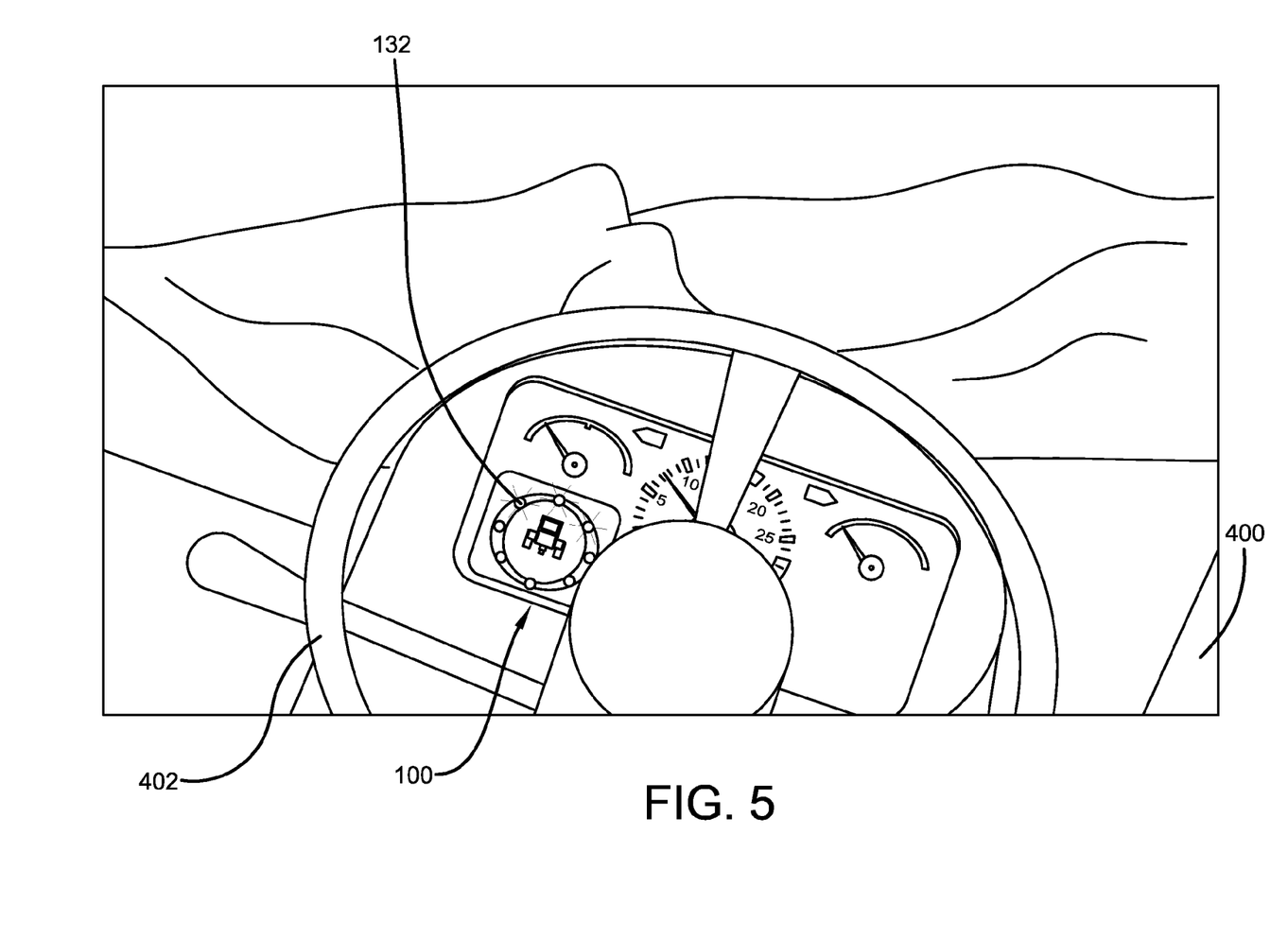
FIG. 5 illustrates a perspective view of the rollover meter device in use with the warning level being reached in accordance with the disclosed architecture.

FIGS. 4-5 illustrate the rollover meter device 100 in use. As stated supra, the rollover meter device 100 comprises a meter housing component 102 that is in electrical communication with a vehicle 400, and a digital display component 110 that displays the current angle of the vehicle 400. The meter housing component 102 comprises microelectromechanical sensors (MEMS) 104, such as a gyro component and two accelerometer components which are mounted on a printed circuit board (PCB) 106, along with LED warning lights 108, which is then secured behind the digital display 110 inside the meter housing component 102. Furthermore, the meter housing component 102 is in electrical communication with a vehicle's gas supply, ignition, blade rotation, and/or Power Take Off (PTO), or external monitoring device (i.e., smart phone or tablet).

In operation, a user (not shown) would choose the size and/or specific design of the rollover meter device 100 that meets their needs and/or wants, depending on the vehicle 400 that it will be attached to. The user would then releasably secure the meter housing component 102 behind the steering wheel 402 to the steering column or dashboard of the vehicle 400 (as shown in FIGS. 3-4). The user would then secure the wiring connection from the meter housing component 102 to the vehicle 400, such that the meter housing component 102 is in electrical communication with the vehicle 400. If desired, the user would then secure the wiring connection from the meter housing component 102 to the vehicle's gas supply, ignition, blade rotation, and/or Power Take Off (PTO), such that the meter housing component 102 is in electrical communication with the vehicle's gas supply, ignition, blade rotation, and/or Power Take Off (PTO), or external monitoring device.

Once the meter housing component 102 is in electrical communication with the vehicle 400 and its gas supply, ignition, blade rotation, and/or PTO, the user can calibrate the tilt angle limits via the push buttons on the front of the meter housing component 102. Specifically, the push buttons would interface with the microprocessor to set the tilt angle limits. The microprocessor will be programmed to calculate critical angles for the user and establish the alarm points by entering the desired vehicles center of gravity and track width. The user can also manually set their own desired alarm points. The user can then operate the vehicle 400 normally, and if a critical angle is reached, or a predetermined critical limit, then the rollover meter device 100 will emit an alarm or warning, and/or flash a light (as shown in FIG. 5). For example, if there is danger of or possibility of a lateral rollover, then a yellow light 130 will flash, and if a lateral rollover is expected rather than possible, a red light 132 flashes. If the yellow 130 or red 132 lights flash, then the displayed angle 134 also flashes. Furthermore, if a critical angle is exceeded and rollover occurs, the rollover meter device 100 can automatically shut off the vehicle's gas supply, ignition, blade rotation, and/or PTO, and an alarm sounds. Thus, the rollover meter device (system) 100 prevents vehicle rollover and minimizes the harm and damage caused if a rollover occurs.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A rollover meter device for use with a vehicle, comprising:
   a meter housing component, comprising:
   a microelectromechanical systems (MEMS) sensor that measures orientation to tilt measurement to obtain a current vehicle tilt angle;
   a microprocessor that receives signals from the MEMS sensor, wherein the microprocessor is programmed to automatically calculate a critical angle for the vehicle based on a user entering vehicle's vehicle identification number (VIN) and downloading vehicle's center of gravity and track width from Internet, wherein the device is connected to the Internet via a USB cable connected to device's charging port, wherein when the critical angle is exceeded, lateral rollover of the vehicle occurs; and
   a universal Bluetooth synced chip that allows the user to communicate with the rollover meter device remotely via a phone or headset, and is in communication with vehicle's warning devices and activates the warning devices when the critical angle is reached, wherein activating the devices includes sounding a horn, flashing a beacon, and making an emergency phone call; and
   a digital display component that displays simultaneously a value representing the current vehicle tilt angle measured by the MEMS sensor and a maximum value representing the critical angle calculated by the microprocessor and comprises a liquid crystal display (LCD) screen and push buttons for monitoring the current vehicle tilt angle, the critical angle of the vehicle and control corrections required for data entry, the digital display also comprises green, red, yellow flashing lights, and a plurality of LED warning lights, wherein the yellow light flashes when there is danger of or possibility of the lateral rollover, and the red light flashes when the lateral rollover is expected rather than possible, wherein the MEMS sensor and the microprocessor are installed on a printed circuit board (PCB) and secured behind the digital display component.

2. The rollover meter device of claim 1, wherein the MEMS sensor comprises a gyro component to detect movement.

3. The rollover meter device of claim 1, wherein the MEMS sensor comprises two tri-axial accelerometer components to measure gravitational pull.

4. The rollover meter device of claim 1, wherein the plurality of warning LED lights are on outside left and right edges of the meter housing component.

5. The rollover meter device of claim 4, wherein the plurality of warning LED lights progress from green to yellow to red that indicates increasing danger of or possibility of the lateral rollover.

6. The rollover meter device of claim 1, wherein the value representing the current vehicle tilt angle is displayed in center of the digital display component and the value flashes when yellow and red ranges are reached as a secondary warning.

7. The rollover meter device of claim 1, wherein the meter housing component is in electrical communication with a vehicle's gas supply, ignition, blade rotation, or Power Take Off (PTO), such that when the critical angle is exceeded and the lateral rollover occurs, the rollover meter device automatically shuts off the vehicle's gas supply, ignition, blade rotation, or PTO, and an alarm sounds.

8. A rollover meter device for use with a vehicle, comprising:
   a meter housing component, comprising:
   a microelectromechanical systems (MEMS) sensor that measures orientation to tilt measurement and comprises a gyro component and two tri-axial accelerometer components to obtain a current vehicle tilt angle;
   a microprocessor that receives signals from the MEMS sensor, wherein the microprocessor is programmed to automatically calculate a critical angle for the vehicle by a user entering vehicle's vehicle identification number (VIN) and downloading vehicle's center of gravity and track width from Internet, wherein the device is connected to the Internet via a USB cable connected to device's charging port, wherein when the critical angle is exceeded, lateral rollover of the vehicle occurs; and
   a universal Bluetooth synced chip that allows the user to communicate with the rollover meter device remotely via a phone or headset, and is in communication with vehicle's warning devices and activates the warning devices when the critical angle is reached, wherein activating the devices includes sounding a horn, flashing a beacon, and making an emergency phone call; and
   a digital display component that displays simultaneously a value representing the current vehicle tilt angle measured by the MEMS sensor and a maximum value representing the critical angle calculated by the microprocessor and comprises a liquid crystal display (LCD) screen and push buttons for monitoring the current vehicle tilt angle, the critical angle of the vehicle and control corrections required for data entry, the digital display also comprises green, red, yellow flashing lights, and a plurality of LED warning lights, wherein the yellow light flashes when there is danger of or possibility of the lateral rollover, and the red light flashes when the lateral rollover is expected rather than possible, wherein the MEMS sensor and the microprocessor are installed on a printed circuit board (PCB) and secured behind the digital display component.

9. The rollover meter device of claim 8, wherein the two tri-axial accelerometer components measure gravitational pull.

10. The rollover meter device of claim 8, wherein the plurality of warning LED lights are on outside left and right edges of the meter housing component.

11. The rollover meter device of claim 10, wherein the plurality of warning LED lights progress from green to yellow to red that indicates increasing danger of or possibility of the lateral rollover.

12. The rollover meter device of claim 8, wherein the value representing the current vehicle tilt angle is displayed in center of the digital display component and the value flashes when yellow and red ranges are reached as a secondary warning.

* * * * *